United States Patent [19]
Jacobs et al.

[11] Patent Number: 5,166,814
[45] Date of Patent: Nov. 24, 1992

[54] LIQUID CRYSTAL DISPLAY INCLUDING A LIQUID FILLED MEMBRANE CUSHION AND MAGNIFIER

[75] Inventors: William A. Jacobs, Boynton Beach; Alfred N. Danial, S. Miami, both of Fla.

[73] Assignee: Motorola, Inc., Schaumburg, Ill.

[21] Appl. No.: 753,123

[22] Filed: Aug. 30, 1991

[51] Int. Cl.⁵ .................. G02F 1/1333; G02F 1/1335
[52] U.S. Cl. ........................................ 359/40; 359/83
[58] Field of Search ............... 359/40, 83; 340/825.44, 340/311.1; 455/351

[56] References Cited
U.S. PATENT DOCUMENTS

| | | | |
|---|---|---|---|
| 4,654,631 | 3/1987 | Kurcbart et al. | 340/311.1 |
| 4,929,062 | 5/1990 | Guzik | 362/31 X |
| 5,002,368 | 3/1991 | Anglin | 359/83 |
| 5,075,824 | 12/1991 | Tan | 359/48 X |

Primary Examiner—William L. Sikes
Assistant Examiner—Ron Trice
Attorney, Agent, or Firm—William E. Koch; Thomas G. Berry; Pablo Meles

[57] ABSTRACT

A liquid crystal display assembly (1) comprises a liquid crystal display (6), a lens (2), and a membrane (4) filled with substantially clear liquid between the lens (2) and the liquid crystal display.

19 Claims, 1 Drawing Sheet

LIQUID CRYSTAL DISPLAY INCLUDING A LIQUID FILLED MEMBRANE CUSHION AND MAGNIFIER

TECHNICAL FIELD

This invention relates generally to liquid crystal displays and, more particularly, to a more break resistant liquid crystal display.

BACKGROUND

Portable electronic products, and in particular, communication devices are decreasing in size as the rush towards miniaturization continues. Regardless, many of the new displays used in portable products are increasing their share of the surface area of the portable product. One of the major structural weak points in portable communication products is the liquid crystal display (LCD) since the remainder of most portable products consists of rigid plastic. Thus, the LCD is one of the first parts to break physically in a portable product. Therefore, a need exists for an LCD display that will allow for the reduction of the size of the LCD while providing increased protection against breakage.

SUMMARY OF THE INVENTION

A liquid crystal display assembly comprises a liquid crystal display, a lens, and a membrane filled with substantially clear liquid between the lens and the liquid crystal display.

DETAILED DESCRIPTION OF THE PREFERRED EMBODIMENT

Figure 1:
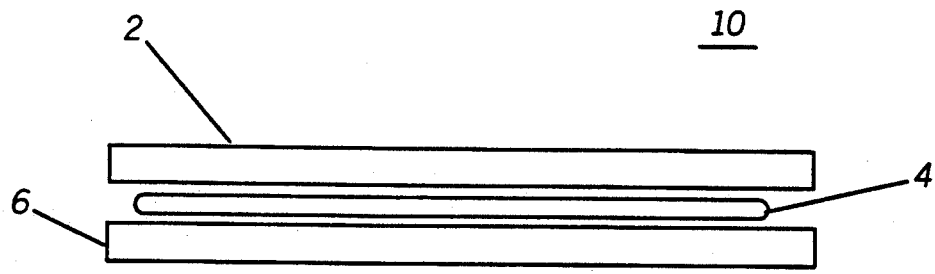
FIG. 1 is a liquid crystal display in accordance with the present invention.
Figure 2:
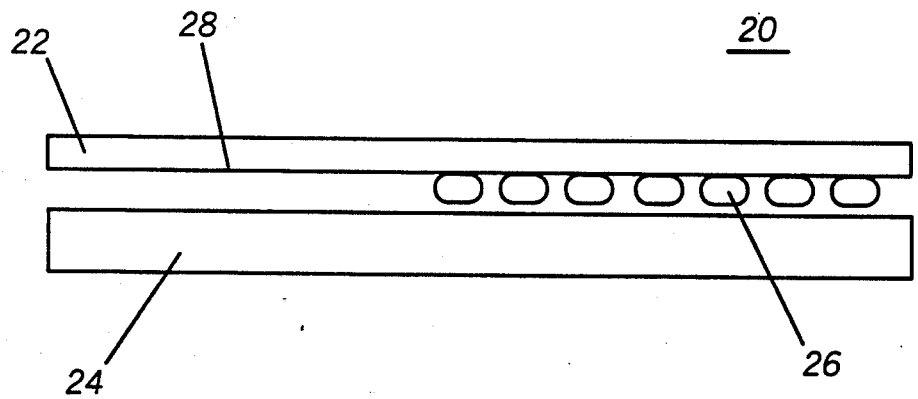
FIG. 2 is another liquid crystal display in accordance with the present invention.

Referring to FIG. 1, there is shown a LCD assembly 10 having an LCD panel 6, a lens 2, and a liquid filled membrane 4 between the LCD and the lens. The liquid filled membrane 4 preferably comprises a bladder containing a transparent or substantially clear liquid. The bladder preferably comprises of a resilient rubber material that will withstand severe impact on the lens, thermal expansion and contraction of the liquid, and resistance to decomposition to ultra-violet radiation. The bladder would provide the function of cushioning or absorbing impacts to the lens by distributing the load over the entire surface of the LCD assembly. Therefore, the likelihood of breakage is reduced. The bladder could also be arranged and constructed so that the refractive index of the liquid could be used to magnify the characters of the LCD. The liquid filled membrane can have a geometric shape to aide in the magnification of the characters in the LCD such as a convex shape. The liquid filled membrane 4 preferably covers the entire surface area of the LCD panel. Alternatively, referring to FIG. 2, an LCD assembly 20 has an LCD panel 24, a lens 22, and a plurality of liquid filled membranes (26), each preferably covering and magnifying a particular character in the liquid crystal display panel 24. Optionally, portions of the LCD panel 24 are not covered (28) as shown, and thus characters in this area will not be magnified to the same extent as the cushioned portions.

Figure 3:
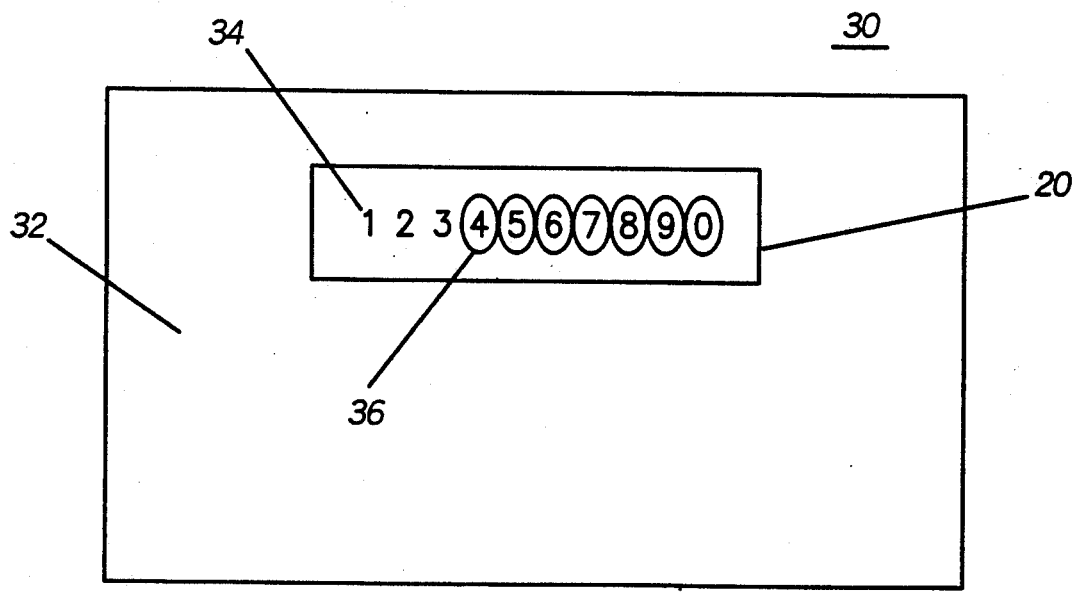
FIG. 3 is a portable electronic product having a liquid crystal display in accordance with the present invention.

Referring to FIG. 3, there is shown a communication device 30 having a housing 32, and the LCD assembly 20 displaying magnified characters (36) where the liquid filled membranes were used and the smaller, less magnified (due to the lens 22 only) characters 34.

What is claimed is:

1. A liquid crystal display device comprising:
   a housing;
   a liquid crystal display panel mounted in the housing;
   a lens mounted above the liquid crystal display; and
   a liquid filled membrane mounted between the lens and the liquid crystal display panel.

2. The liquid crystal display device of claim 1, wherein said device comprises a communication device.

3. The liquid crystal display device of claim 2, wherein said device comprises a pager.

4. The liquid crystal display device of claim 2, wherein said device comprises a radio.

5. The liquid crystal display device of claim 1, wherein the liquid filled membrane comprises a substantially transparent rubber bladder.

6. The liquid crystal display device of claim 1, wherein the liquid in the liquid filled membrane comprises a substantially transparent liquid.

7. The liquid crystal display device of claim 1, wherein the liquid in the liquid filled membrane comprises water.

8. A liquid crystal display assembly, comprising:
   a liquid crystal display;
   a lens; and
   a membrane filled with substantially clear liquid between the lens and the liquid crystal display.

9. The liquid crystal display assembly of claim 8, wherein said membrane covers the entire surface area of the liquid crystal display.

10. The liquid crystal display assembly of claim 8, wherein said membrane covers portions of the surface area of the liquid crystal display.

11. The liquid crystal display device of claim 8, wherein the liquid filled membrane comprises a substantially transparent rubber bladder.

12. The liquid crystal display device of claim 8, wherein the liquid in the liquid filled membrane comprises water.

13. A communication device, comprising:
    a housing;
    a liquid crystal display within the housing;
    a lens above the liquid crystal display and within the housing; and
    a membrane filled with substantially clear liquid between the lens and the liquid crystal display.

14. The communication device of claim 13, wherein said device comprises a pager.

15. The communication device of claim 13, wherein said device comprises a radio.

16. The communication device of claim 13, wherein the membrane comprises a substantially transparent rubber bladder.

17. The communication device of claim 13, wherein the substantially clear liquid in the membrane comprises water.

18. The communication device of claim 14, wherein said membrane covers the entire surface area of the liquid crystal display.

19. The liquid crystal display assembly of claim 13, wherein said membrane covers portions of the surface area of the liquid crystal display.

* * * * *